US007848368B2

(12) United States Patent
Gapontsev et al.

(10) Patent No.: US 7,848,368 B2
(45) Date of Patent: Dec. 7, 2010

(54) FIBER LASER SYSTEM

(75) Inventors: Valentin P. Gapontsev, Worcester, MA (US); Valentin Fomin, Burbach (GE); Nicholai Platonov, Worcester, MA (US)

(73) Assignee: IPG Photonics Corporation, Oxford, MA (US)

( * ) Notice: Subject to any disclaimer, the term of this patent is extended or adjusted under 35 U.S.C. 154(b) by 77 days.

(21) Appl. No.: 12/411,732

(22) Filed: Mar. 26, 2009

(65) Prior Publication Data
US 2010/0002730 A1    Jan. 7, 2010

Related U.S. Application Data

(62) Division of application No. 11/973,437, filed on Oct. 9, 2007, now Pat. No. 7,593,435.

(51) Int. Cl.
*H01S 3/30* (2006.01)
(52) U.S. Cl. .................. 372/6; 372/5; 372/69; 372/70; 372/108

(58) Field of Classification Search ............... 372/5–6, 372/69–70
See application file for complete search history.

(56) References Cited
U.S. PATENT DOCUMENTS
6,477,295 B1 * 11/2002 Lang et al. .................. 385/31
7,286,283 B2 * 10/2007 Starodoumov ......... 359/341.33

* cited by examiner

*Primary Examiner*—Dung T Nguyen
(74) *Attorney, Agent, or Firm*—Yuri Kateshov

(57) ABSTRACT

A powerful fiber laser system is configured with at least one large-area multi-clad rare-earth doped fiber, which is configured with a MM core capable of propagating a single mode laser emission at a first wavelength, and with at least one pumping assembly capable of generating an optical pump output at a wavelength shorter than the first wavelength of the rare-earth doped fiber. The pumping assembly has a plurality SM fiber lasers coupled to a SM-MM combiner which is operative to lunch the pump output into the cladding of the rare-earth doped fiber so that the powerful fiber laser system is operative to deliver a power of up to 20 kW.

14 Claims, 4 Drawing Sheets

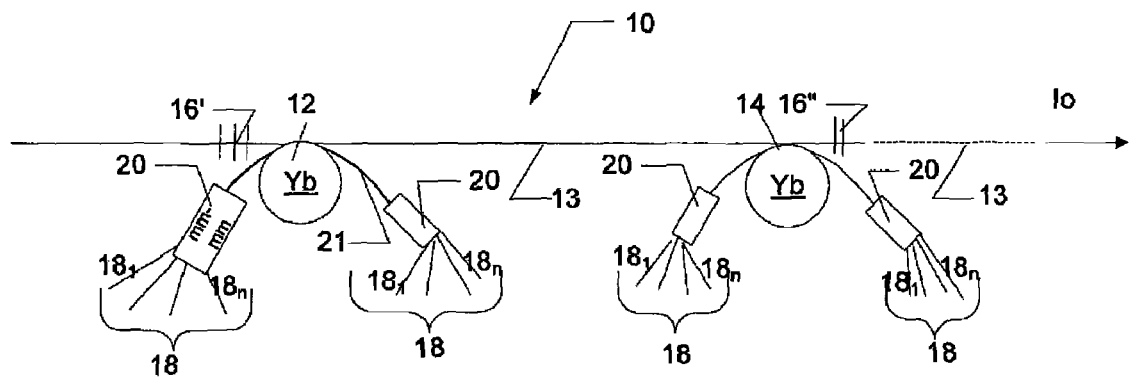
Prior Art
FIG. 1
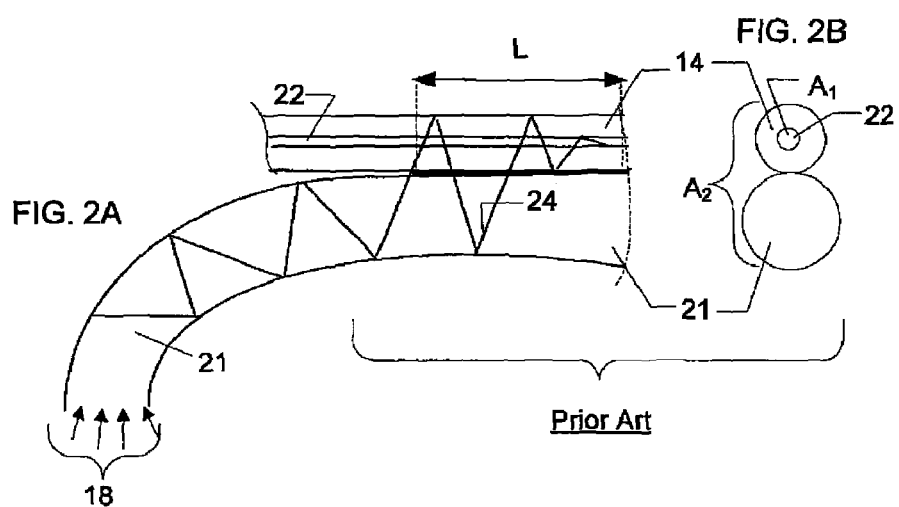
Prior Art

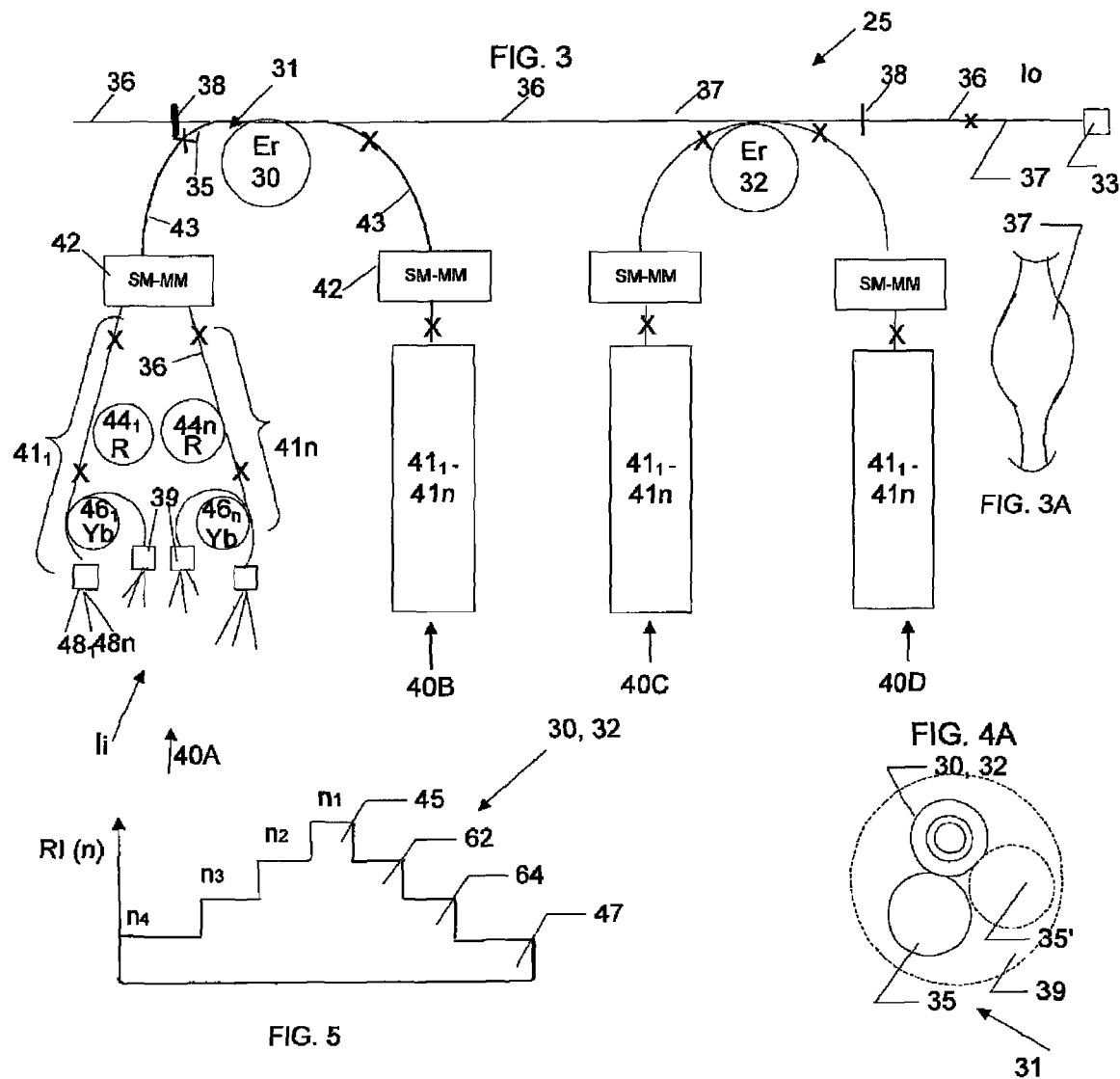

FIBER LASER SYSTEM

PRIORITY CLAIM

This application is a division of U.S. patent application Ser. No. 11/973,437 filed Oct. 9, 2007 now U.S. Pat. No. 7,593,435.

BACKGROUND OF THE DISCLOSURE

1. Field of the Disclosure

This disclosure relates to a fiber laser system. In particular, the disclosure relates to at least one gain block configured with a multi-clad multi-mode (MM) active fiber, and a pump assembly provided with a plurality of single-mode (SM) fiber lasers and operative to launch a low mode pump output into one of the claddings of the active fiber.

2. Background of the Disclosure

The prior art powerful fiber laser systems known to applicants are limited in power. However, the areas including, among others, laser material processing, military, printing, cutting, marking and drilling are in need for fiber laser systems delivering higher than presently available output powers while generating a high quality light beam.

FIG. 1 illustrates a general schematic view of a multi-cascaded fiber laser system 10 of the known prior art while FIG. 11B illustrates system 10 shown with pumping assemblies. The system 10 is capable of delivering a SM output power of up to about 2-3 KW—one of the highest among known systems—while generating an optical output in a 1 micron (μm) band. The multi-cascaded system 10 includes an ytterbium (Yb) fiber oscillator 12 and multiple Yb fiber amplifiers 14 (only one is shown) coupled in series to one another by respective passive photosensitive fibers 13. Adjacent photosensitive SM fibers 13 have respective HR fiber grating 16' and fiber grating 16" defining a laser cavity which receives oscillator 12 and amplifier 14. The oscillator 12 and amplifiers 14 are configured with respective Yb-doped double clad fibers, each of which is pumped by a plurality of combined 25 W MM laser diodes 18. The pump light from each plurality of MM diodes 18 is launched into the inner cladding of respective Yb fibers 12, 14 by a dedicated MM-MM combiner 20. A system output signal is propagated through a single mode (SM) delivery fiber 13. The system 10, while being robust, compact and enjoying a well-deserved commercial success, is limited in power for the following reasons.

Providing additional cascades, each of which is pumped by a dedicated pump assembly, and/or increasing a pumping power of each existing pump assembly, theoretically, can lead to greater powers of system 10. However, neither of these solutions may be effective, as explained below.

Adding amplifying cascades in excess of three leads to the increased length of system 10. One of ordinary skills in the laser art readily understands that with the increased length of system 10, the non-linear effects, which restrict the efficiency and operability of the system, also increase.

For example, one of these non-linear effects arises from stimulated Raman scattering (SRS). The Raman effect allows for much of the pump energy to be transferred to light at the lower frequency, called the Stokes component. In other words, the SRS involves a type of resonance resulting in generating new wavelengths of light. In certain situations, this phenomenon is of a great positive importance; in others, as here when system 25 operates in a 1μ band, it is a detriment because at some of these Raman-generated wavelengths, the laser power is saturated. Thus, even if the greater pump powers were available, they would not translate into a precipitously greater output and, thus, render system 10 inefficient. A solution to this particular problem includes increasing a wavelength at which the fibers operate.

Furthermore, the higher concentration of rare earth elements, the more efficient Yb fibers 12-14. However, as a rule, during doping, a small amount (a few ppm) of impurities is also introduced into active fibers. At the fiber lengths of about 30-40 meters, these impurities are responsible for up to one (1) dB of losses at the desired laser wavelength. At this dB level, adding new cascades makes no sense since the amplifiers are saturated. Hence, system 10 becomes inefficient.

Increasing the pump power of each pump assembly above presently available is also problematic. The system 10 requires that the pump light be generated at a wavelength of about 970-980 nm to operate at the desired lasing wavelengths. To meet this requirement, system 10 utilizes relatively powerful MM 20-25 W diodes 18, the use of which poses serious problems preventing higher than presently available pump powers for the following reasons.

To begin with, applicants are unaware of MM diodes more powerful than currently used in system 10 for the desired wavelength. Furthermore, even if more powerful 970-980 nm MM diodes were available, they would not solve at least some of further problems associated with fiber system 10, as discussed below.

One of these problems is excessive heat generated by high pumping powers. Currently, for example, nineteen (19) pumping diodes 18 (thirty eight (38) bidirectionally), coupled to each of Yb-doped fibers 12, 14, generate a heat of about 250 W in each cascade. Even with the most sophisticated heat reducing efforts, temperatures still do not fall far below 100° C. in each cascade of system 10. Accordingly, if more powerful MM diodes were available, the heat problem would be even more severe. To reduce the heat generation, as readily understood by one of ordinary skills in the laser art, the difference between a pump wavelength (Lp) and a lasing emission wavelength (Le), at which active fibers 12-16 operate, should be minimized.

Even if the elevated temperatures were kept under control, the possibility of combining together more than nineteen MM diodes 18, for example thirty seven or more diodes, by existing MM-MM combiners 20 would be technologically challenging. The overall diameter of the combiner's output 21, which guides light from MM-MM combiner 20 to an inner cladding of a respective one of fibers 12, 14, increases with the number of diodes 18. However, lightguide 21 coupled to the pump input of active fiber 12, 14 should remain as small as possible for the reasons explained immediately below.

In accordance with a well known side pumping technique, which is preferably used in system 10, a doped core of each of Yb-doped oscillator and amplifier 12, 14, respectively, can effectively absorb pump light energy delivered by lightguide 21 along a certain coupling length. When the diameter of lightguide 21 increases with a greater number of MM diodes 18, the coupling length should be increased in order to effectively absorb the light delivered by output lightguide 21. The increased coupling length is associated with increasing non-active losses in rare-earth-doped fibers.

One of possible solutions to the above-discussed problem is to reduce the diameter of lightguide 21. However, this may be impossible for the following reason. Each of MM diode 18 has a large numerical aperture (NA). To couple light emitted by multiple MM diodes 18 to a pump input 21 of oscillator 12, for example, the latter has to have a NA large enough to receive the light from combined diodes 18. This, in turn, is associated with greater fiber lengths to effectively couple light propagating through lightguide 21 to respective Yb-doped fibers 12, 14. As discussed above, the greater lengths are highly undesirable because of non-linear effects. A solution to these problems lies in SM high pump power sources which are combined in a SM-MM combiner having its output lightguide 21 minimally sized. The core of the lightguide should be dimensioned to provide for minimal ratio between the area $A_1$ of the core of Yb fiber 12 to the area $A_2$ of the entire 8-shaped configuration of FIGS. 2A and 2B including the sum of the areas of cladding of Yb fiber 12 and lightguide 21, respectively.

Furthermore, it is highly desirable to have a diffraction-limited (bright) pump light. To meet this need, SM pump fiber diodes combined by a SM-MM combiner should be used. However, at the desired wavelengths, SM pump diodes are not powerful. Accordingly, the pump light generated by presently used MM diodes combined by MM-MM combiner 20 is far from having a high quality beam.

As to the wavelength, light emitted by system 10 in a range of about 1.06-1.0.8 μm, when scattered, may not be completely eye-safe. Thus, manufacturing facilities and industrial sites associated with an operation of 1 μm powerful laser systems may be confronted with expenses stemming from additional safety measures.

Also, as known, a signal, emitted at about 1-1.4 μm at long distances of up to kilometers, experiences substantial hydrogen-induced losses. Thus, to effectively utilize powerful lasers in applications involving, for example, a subterranean drilling or military operations, an optical signal, preferably, should be emitted at a wavelength of about 1.4-1.6 μm known for minimal hydrogen-induced power losses.

To obviate the eye-hazardous situation, it is possible to substitute Yb-doped fibers 12, 14 for Yb/Er-doped fibers in system 10 which emits light in an eye-safe 1.5 μm band. However, at high pump powers, Yb/Er fibers are associated with the appearance of color centers which tend to extend into a UV range. This phenomenon is critically detrimental to a lightguide, which rapidly degrades. Furthermore, the Yb/Er fiber systems are associated with excessively elevated temperatures affecting the operability of active fibers.

It is, therefore, desirable to provide a powerful fiber laser system operative to deliver a power of at least 10 kW and, preferably, about 20 kW.

It is further desirable to provide a powerful fiber laser system with a pumping assembly, which comprises a plurality of SM fiber pumps combined by a SM-MM combiner so as to launch a high beam quality pump light into one of the inner claddings of an LMA multi-clad multimode (LMA MC&MM) active fiber, which is configured with a core capable of supporting a fundamental mode without mode distortion It is further desirable to reduce heat generation in a powerful fiber laser system including at least one LMA MC&MM rare-earth doped fiber, which is operative to lase a signal output at a first wavelength (Le), and a pump source operative to emit an optical pump output at a second wavelength (Lp), wherein the Le/Lp is less than 0.05 Lp.

It is further desirable to provide a multi-cascaded powerful fiber laser system including a plurality of LMA MC&MM rare-earth-doped active fibers each of which is configured with a core capable of supporting a fundamental mode, signal SM photosensitive fibers coupled to and alternating with the active fibers, and respective pumping assemblies, each of which includes a plurality of SM fiber lasers combined by a SM-MM fiber combiner so as to launch a pump light in the MM inner cladding of the active fiber.

It is further desirable to provide a multi-cascaded powerful fiber laser system configured with an LMA MC&MM Er-doped oscillator and at least one similarly configured fiber amplifier or booster each pumped by a dedicated pump assembly, which includes a plurality of SM Raman fiber pumps combined by a SM-MM combiner so as to deliver a high beam quality pump light to the inner cladding of a respective one of Er-doped oscillator and at least one amplifier or booster.

It is further desirable to provide a multi-cascaded powerful fiber laser system including an LMA MC&MM Er-doped fiber oscillator and at least one LMA MC&MM Er-doped fiber amplifier or booster each pumped by a dedicated pumping assembly, which is configured with a plurality of SM Yb/Er-doped fiber lasers combined by a SM-MM combiner so as to deliver a high-quality low mode—up to 10 different modes—light beam to the MM cladding of a respective one of Er-doped oscillator and at least one amplifier.

It is further desirable to provide a multi-cascaded fiber laser system with an LAM MC&MM Tm oscillator and at least one similarly configured Tm-doped fiber amplifier, wherein the MM cladding of each Tm-doped component receives a pump light from a respective pumping assembly which has a plurality of SM Er-doped lasers combined by a SM-MM combiner.

It is further desirable to provide a powerful fiber laser system operating in an eye-safe wavelength band.

It is further desirable to provide a powerful multi-cascaded fiber laser system including a plurality of LAM MC&MM Yb-doped fiber oscillator and an at least one Yb-doped fiber amplifier, each of which has a core configured to support a fundamental mode, and a plurality of fiber pumping assemblies each including multiple SM Nd-doped fiber lasers which are combined by a SM-MM combiner so as to lunch a pump light in the MM cladding of the Yb-doped active fiber component.

It is further desirable to provide a powerful multi-cascaded fiber laser system including a plurality of LAM MC&MM Yb-doped fiber oscillator and an at least one Yb-doped fiber amplifier each of which has a core configured to support a fundamental mode, and a plurality of fiber pumping assemblies each including multiple SM Yb-doped fiber lasers which are combined together by a SM-MM combiner so as to lunch a pump light in the MM cladding of the Yb-doped active fiber component.

SUMMARY OF THE DISCLOSURE

The above-enumerated and other needs are satisfied by a multi-cascaded powerful fiber laser system operative to deliver an output power of up to about 20 KW. The disclosed powerful fiber laser system is configured with at least one pumping assembly generating an optical output at a pump wavelength Lp, which is lunched in a MM cladding of large mode area multi-clad and multimode (LAM MC&MM) active fiber. The LAM MM&MC active fiber is capable of lasing an optical system output at a wavelength Le, wherein the Le/Lp is less than 0.05 Lp. Since the pump and signal wavelengths are close to one another, despite great powers, the disclosed fiber laser system does not generate an excessive heat and, therefore, is efficient.

The high output powers of the disclosed system, as compared to the known prior fiber laser systems, are due to the disclosed configuration of a pumping assembly which has a plurality of SM fiber laser pumps, combined by a SM-MM beam combiner. Each of the SM fiber pumps is operative to generate a power of up to about 200 W, which is substantially higher than that one of MM fiber laser diodes of the prior art.

A SM-M beam combiner has its inputs coupled to respective outputs of the SM fiber laser pumps. Because the fiber laser pumps of the pumping assembly each have a SM configuration, as opposed to a MM configuration of fiber laser diodes of the prior art, the disclosed pumping assembly outputs a low-mode (LM) high beam quality pump light with the $M^2$ factor being at most 8 and, preferably, less than 4.

In accordance with one embodiment of the disclosure, a powerful fiber laser system is a multi-cascaded fiber laser system configured with a gain block which is based on a multiclad and multi-mode Er fibers (further referred to as MC&MM Er fibers). The MC&MM Er fibers include an oscillator and at least one amplifier coupled in series with one another via respective SM photosensitive fibers. The cores of the respective MC&MC Er fibers each are configured so as to distorlessly support a fundamental mode and mode-match the SM photosensitive fibers.

The powerful fiber laser system further has a plurality of pumping assemblies selectively pumping the MC&MM Er fibers. Each of the pumping assemblies includes a plurality of channels. Each channel has a plurality of primary sources, such as powerful 980 μm MM laser diodes coupled to respective inputs of a MM-MM combiner. Each channel further has a plurality of pump-signal transforming stages. The initial, upstream, pump-signal transforming stage is configured with a SM Yb laser receiving the output signal emitted by the combiner, and further transforms a pump signal to the downstream or output pump-signal transforming stage. The downstream pump-signal transforming stage includes a Raman fiber pump capable of outputting the pump signal at the desired wavelength.

A plurality of Raman fiber pumps of respective pumping channels is further combined by a single-mode/multi-mode (SM-MM) combiner. The output lightguide of the SM-MM combiner delivers the low-mode high quality beam pump light to an inner cladding of the MC Er fiber. Depending on the number of cascades, which is preferably, but not necessarily, three, the ultra powerful SM fiber laser system of the first embodiment is operative to deliver up to 20 KW and generate a system optical output at the desired wavelength.

In accordance with a further embodiment of the disclosure, a powerful fiber laser system is a multi-cascaded fiber system configured with respective gain blocks each including a multi-clad multimode Er fiber (further referred to as MC&MM Er fibers) with its core capable of supporting a fundamental mode. The LMA MC&MM fibers include an oscillator and at least one amplifier coupled in series with one another.

Multiple pumping assemblies selectively energize the MC&MM Er fibers. Each of the pumping assemblies includes a plurality of pumping channels. Each channel has a plurality of primary sources, such as powerful 970-980 nm MM diode lasers combined by a MM-MM combiner which has an output delivering the diode light to a signal transforming stage. The signal transforming stage includes an Yb/Er fiber laser pump capable of outputting pump signal at the desired wavelength.

The plurality of Yb/Er fiber laser pumps of respective channels are further combined by a SM-MM combiner. The output lightguide of the SM-MM combiner delivers a low-mode high beam quality pump light into the inner cladding of the MC&MM Er fiber. As a result, the powerful fiber system of the second embodiment is operative to deliver up to 20 KW and generate a system optical output at the desired wavelength.

In accordance with a further embodiment of the disclosure, a powerful fiber laser system is a modular multi-cascaded fiber system configured with an multi-clad multi-mode Tm fibers (further referred to as MC&MM Tm fibers) operative to maintain a fundamental mode. The MC&MM Tm fibers include an oscillator and at least one amplifier coupled in series with one another via respective passive fiber and each configured to support a fundamental mode.

The powerful fiber laser system further has a plurality of pump sources selectively energizing the MC&MM Tm fibers. Each of the pump sources includes a plurality of channels. Each channel has a plurality of primary sources, such as powerful MM laser diodes and a MM-MM combiner coupled to the output of the plurality of MM laser diodes and having a respective output guiding a pump signal to a SM Yb/Er fiber laser pump, which generates an optical pump signal at a wavelength of about 1550-1560 nm. A plurality of SM Yb/Er fiber pumps of the respective channels of each pumping assembly is coupled to respective inputs of a SM-MM combiner, whose output delivers a high quality beam to an inner cladding of LMA MC Tm lasers. The system configured in accordance with this embodiment is operative to deliver up to a 20 KW and generate a signal in an eye-safe range.

A further aspect is concerned with one or more pumping assemblies each configured with a plurality of diode-pumped single mode Nd pump fiber laser pumps which are combined by a SM-M combiner delivering a low mode high quality beam pump light to a MC&MM Yb active fiber. In accordance with still a further aspect of the disclosure, a plurality of diode-pumped SM Yb fiber pumps combined by a SM-MM combiner pump MC&MM Yb active fibers. The above disclosed powerful fiber laser system may operate both in continuous wave and pulsed regimes.

BRIEF DESCRIPTION OF THE DRAWINGS

The above and other features and advantages of the present disclosure will become more readily apparent from a further description given in conjunction the following drawings, in which:

FIG. 1 a schematic view of the powerful fiber laser system configured in accordance with the known prior;

FIG. 2 is an elevated end view of the side-pumping arrangement of FIGS. 1A&B

FIG. 3 is a schematic view of one of the embodiments of the powerful SM fiber laser system configured in accordance with the present disclosure including a plurality of LMA MC&MM Er active fibers pumped by respective pumping assemblies each of which is provided with a plurality of SM Raman fiber pumps;

FIG. 3A diagrammatically illustrates a shape of a SM passive delivery fiber;

FIG. 4A is an elevated side view of a fiber coupler of a gain block based on an Er-doped active fiber in a side pumping arrangement of the laser system illustrated in FIG. 3;

FIG. 4B is an elevated end view of a coreless passive fiber representing the pump input of the fiber coupler of FIG. 4;

FIG. 5 is a refractive index profile representing a multi-clad active fiber;

SPECIFIC DESCRIPTION

Figure 6:
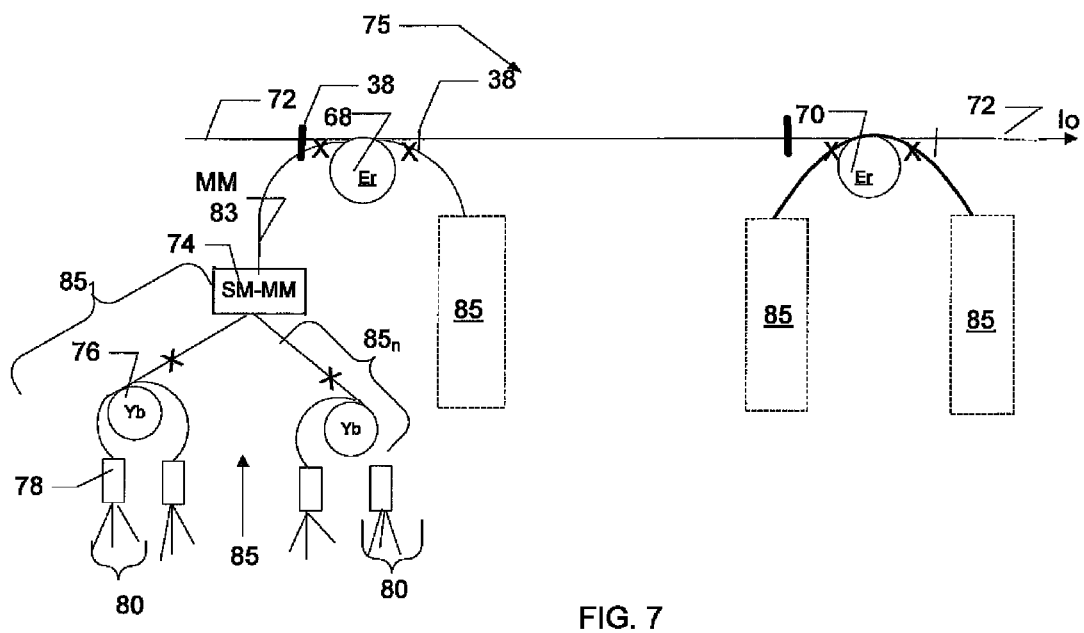
FIG. 6 is a schematic view of a powerful fiber laser system configured in accordance with a further embodiment of the present disclosure including a plurality of LMA MC&MM Er active fibers pumped by respective pumping assemblies each of which is provided with a plurality of SM Yb/Er-codoped fiber pumps.

Reference will now be made in detail to the disclosed system. Wherever possible, same or similar reference numerals are used in the drawings and the description to refer to the same or like parts or steps. The drawings are in simplified form and are far from precise scale. For purposes of convenience and clarity only, the terms "connect," "couple," "combine" and similar terms with their inflectional morphemes do not necessarily denote direct and immediate connections, but also include connections through mediate elements or devices. The term "pump" and "fiber laser pump" are used interchangeably.

FIG. 3 illustrates one embodiment of powerful fiber laser system 25 operative to lase a system output in a 1.5 μm band and capable of delivering a maximum power in a range between about 10-20 KW. The system 25 includes a plurality of single mode (SM) photosensitive passive fibers 36 each having at least one Fiber Bragg grating (FBG). The SM fibers are spaced from one another so that adjacent FBGs $38_1$ and $38_n$, written in the respective photosensitive fibers 36, define a laser cavity. The FBG $38_1$ is a highly reflecting (HR) grating defining the input side of the cavity, and FBG $38_n$ is less reflective grating which defines the output side of the cavity.

Placed in the laser cavity is at least one gain block based on a large mode area (LMA) multi-clad (MC) and multimode (MM) Er-doped fiber oscillator (EDFL) 30 which is capable of lasing a system optical output at the desired wavelength (Le) in the 1.5 μm band. The oscillator 30 is configured with a MM core capable of generating the laser emission substantially in a fundamental mode at wavelength Le.

The system 25 further may have at least one or more additional gain blocks based on LMA MC&MM Er fiber amplifiers 32, which are configured similarly to oscillator 30 and operatively spliced to the downstream one of photosensitive SM fibers 36. Although only two gain blocks are shown, system 25 may be configured with at least one more gain block.

Turning to FIG. 3A, system 25 further has an ultra-high power passive delivery fiber 37 having a shape of two bottom-juxtaposed bottles. The passive delivery fiber 37 has an input region substantially losslessly spliced to downstream SM photosensitive fiber 36 and an output end region. The passive delivery fiber 37 is configured as a multiclad passive fiber (PF) with a multimode core propagating the fundamental mode of the laser emission without an essential coupling to higher modes. At least along the input end region, the mode field diameter of the delivery fiber's core is substantially matched to the mode diameter of SM photosensitive fibers 36 and EDFLs 30 and 32 at the desired wavelength and is about 14 μm. A substantially uniform mode filed diameter allows for technologically simple and lossless fusion splicing of the system fiber components with one another.

Returning to FIG. 3, an output connector 33 having a silica glass beam expander spliced to the output end region of delivery fiber 37 and configured to couple system 25 to an end device completes system 25. The gain blocks each have a fiber coupler 31 having at least one pump input spliced to the output of a pumping assembly.

Each of EDFLs 30-32 is pumped by one or more pumping assemblies 40A-40D. The pumping assemblies 40A-40D each include a plurality of channels $41_1$-$41n$, which are uniformly structured. Although the following description relates only to channel $41_1$ of pumping assembly 40A, it is understood that it is equally applicable to all channels 41.

The channel $41_1$ of pumping assembly 40A includes an array of primary sources, MM laser diodes $48_1$-$48n$, combined together by a MM-MM combiner 39. An initial optical signal generated by the plurality of primary sources 48 at a wavelength of about 970-980 nm is received by a first pump signal-transforming stage including an Yb-doped fiber laser $46_1$ so as to emit a transformed optical output at a wavelength of about 1.06-1.08 μm. The channel $41_1$ further has a second pump signal-transforming stage provided with a SM Raman fiber shifter (further referred to as a Raman fiber laser) $44_1$ having its input spliced (as indicated by a symbol "X") to the output of Yb-doped laser 46 via a passive fiber 36. The SM Raman fiber lasers $44_1$-$44_n$ each generate a pump output at a wavelength from about 1.48-1.51 μm and capable of delivering a maximum power of about 50-200 W (and even higher).

The output ends of all SM Raman fiber lasers of respective channels $41_1$-$41n$ of pumping assembly 40A are spliced to respective input ends of SM-MM combiner 42. A MM output lightguide 43 of SM-MM combiner 42 is spliced to a pump fiber input 35 of a fiber coupler unit 31 of EDFL 30, as will be discussed below in detail.

As known, the Raman lasers are not doped with rare-earth ions. To increase Raman gain, typically the passive fiber of the Raman laser is doped with high concentrations of germanium (Ge) or phosphorous (P). The high concentrations of these dopants allow for standard smaller Raman's core of about 3-3.5 μm. However, a mode size of Yb fibers 46 is relatively large compared to the mode size of the standard Raman laser's core. Accordingly, unless the core of the presently disclosed Raman laser is enlarged, during splicing, light emitted by Yb lasers 46 will experience undesirable losses. To match the mode size of respective Yb laser 46 and Raman laser 44, each Raman laser 44 of the present disclosure is configured with a larger than usual core diameter of about 7-11 μm. Furthermore, the disclosed Raman pump has a relatively short length not exceeding about 150 m. As readily understood by one of ordinary skills in the laser art, typically, the enlargement of the Raman core also increases the numerical aperture (NA) of Raman fiber, which, however, has to be kept low in order to prevent the mode mixing (excitement of higher modes) and fiber nonlinearity. This is achieved by introducing fluoride (F) dopants (along with germanium or phosphate) into the core of Raman laser, which decreases the refractive index of the core. In addition, the refractive index of the cladding of Raman laser is increased as a result of forming a pedestal. Accordingly, the numerical aperture of Raman laser 44 is reduced to about 0.07, while its core is enlarged only to the desired dimensions. The relatively small NA and relatively large core diameter allow for the desired Raman mode size which matches that one of Yb lasers. As a consequence, the splicing of each pair of Raman and Yb lasers 44 and 46, respectively, is associated minimal pump signal losses. The disclosed Raman lasers 44 each are operative to deliver about 100-200 W in response to a pumping power delivered by a respective Yb laser 46 whose power may reach, for example, up to 200-400 W.

Note that it is known to modify the refractive index by using both fluoride and a pedestal. However, both of these components are used for minimizing the numerical aperture in active fibers. In contrast, Raman fiber is a passive fiber.

The outputs of respective Raman Lasers 44 each are spliced to a SM input of SM-MM combiner 42. A MM output lightguide 43 of SM-MM combiner 42 has its output end spliced to a passive MM coreless fiber 35 which is configured as the pump input of coupler 31, as will be explained later in detail.

Besides delivering a high power, disclosed pumping assemblies 40A-40D each has other structural and optical advantages over the known prior art. For example, MM output lightguide 43 of SM-MM combiner 42 has about a 50 μm core which is four times smaller than that one of the MM-MM combiner's output lightguide for nineteen MM laser diodes 18 of system 10 of FIG. 1. At the same time, since the pump power produced by, for example by nineteen 100 W Raman pumps, is 1900 W, the power density in MM lightguide 43 and, thus, in coreless fiber 35 is substantially higher than that one of the prior art. Therefore, because of the high power density and the small diameter of lightguide 43, coreless pump input fiber 35 has a substantially smaller diameter than that one of the prior art. As a result, the disclosed system 25 is configured so that the pump light energy can be absorbed along a coupling length from about 3 to about 7 m. Such a coupling length is short enough to prevent passive absorption and other non-desirable effects which may detrimentally affect EDFL 30, 32.

The use of SM-MM combiner 42 (FIG. 3) with a low-mode output is also important because each pump assembly 40A-40D generates an optical pump signal of high beam quality. The beam quality of an optical signal can be defined in different ways, but is basically a measure of how tightly a laser beam can be focused under certain conditions. The most common way to quantify the beam quality, among others, is the determination of the $M^2$ factor. The $M^2$ factor of a laser beam limits the degree to which the beam can be focused for a given beam divergence angle, which is often limited by the numerical aperture. Together with the optical power, the $M^2$ factor determines the brightness (more precisely, the radiance) of the laser emission. In the present disclosure, the $M^2$ factor of the pump output beam does not exceed 8 and may be as low as about 4. A physical manifestation of such a high quality beam is its limited divergence and enhanced brightness as compared to the known prior art of FIGS. 1 and 2. While the use of SM-MM combiner is preferable for the reasons disclosed above, a MM-MM combiner can be used as well.

Returning to FIG. 3, pump radiation may be lunched into the inner cladding of each of EDFLs 30, 32 utilizing a side pumping technique. In accordance with this technique, output lightguide 43 of SM-MM combiner 42 is spliced with a coreless passive fiber 35, a pump inlet, of fiber coupler 31. As a result, a low-mode pump beam, which propagates through these spliced fibers, is launched into one of the inner claddings of EDFL 30. The pump light can be launched in opposite directions, as shown in FIG. 3, a co-propagating or counter-propagating direction all conceived within the scope of the present disclosure.

FIG. 4A illustrates the elevated end view of the side-pumping arrangement, representing coupler unit 31 of EDFL 30 and referred to as a twin-fiber configuration. The coreless fiber section 35 of the pump input of fiber coupler 31 has its outer surface in optical contact with the outer surface of outer cladding of EDFL 30 along the desired coupling length. The desired length is selected so that it is sufficient for the active fiber of EDFL 30 to absorb and convert the low mode pump beam into the system optical output. The optical contact is achieved by placing the sections of the respective active and coreless fibers 30, 35, respectively, in a side-by-side arrangement or twisting coreless fiber 35 around active fiber 30. The active and coreless fibers 30 and 35, respectively, are so coupled that their opposite ends can be easily separated from one another upon applying a pulling force. Such an easy separation facilitates further splicing of the separated ends with respective fibers upstream and downstream from the gain block. In particular, one of the ends of passive coreless fiber 35 is spliced to LM output lightguide 43 of SM-MM combiner 42, whereas the opposite ends of the active fiber are spliced with respective passive fibers 36 (FIG. 3). The pump light is restricted to the cladding of active fiber 30 and is gradually absorbed by Er ions in its core along the desired coupling length. The configuration of fiber coupler unit 31 is completed by a protective coating 39 (FIG. 5A) controlling a NA so that it varies from about 0.5 to about 0.6.

As further shown in FIG. 4A, disclosed ultra-power laser system 25 may have a so-called triple fiber arrangement of fiber coupler 31 including an additional pumping assembly (not shown) which is identical to, for example, assembly 40A and an additional SM-MM combiner identical to combiner 42. The output of the additional combiner is spliced to a respective pump input 35' of coupler 31. The analogous double and triple fiber configurations may be utilized in each of the disclosed embodiments.

The scope of the disclosure also encompasses an end pumping configuration, in accordance with which the pump light is lunched in the inner cladding of EDFL 30 by splicing lightguide 43 of pump source 40A to the input faucet of highly reflective BG 38. This configuration is not shown but readily understood by one of ordinary skills in the art. While the system utilizing the end pump configuration may not be as powerful as a multi-cascaded structure shown in FIG. 3, the configuration of the disclosed pumping assembly remains the same as disclosed above.

FIG. 5 illustrates a refractive index profile of EDFLs 30 and 32. Configuring the present ultra-powerful system, it is important to waveguide a scattered laser emission so as to prevent penetration thereof back to output lightguide 43 of SM-MM combiner 42. While the Er-doped fiber of gain blocks 30, 32 may have a single-clad or multi-clad configuration, preferably, it is configured as a triple-clad configuration practically eliminating the possibility of back penetration. A core 45 of EDFLs 30, 32 is provided with an $n_1$ refractive index and an inner cladding or pedestal 62 with an $n_2$ refractive index around the core. An outer cladding 64 has an $n_3$ refractive index. A protective coating 47 surrounding the outer cladding has an $n_4$ refractive index. The refractive indexes are selected so that $n_1 > n_2 > n_3 > n_4$, whereas a difference $\Delta n$ between refractive indexes $n_2$ and $n_3$ of the inner and outer claddings, respectively, is sufficient to waveguide a scattered laser emission and prevent penetration thereof back into the MM output fiber of SM-MM combiner 42 which is disclosed in detail hereinbelow.

The LMA EDFLs 30-32 (FIG. 3) have respective MM cores each capable of propagating a fundamental mode without mode coupling. A mode field diameter of EDFL 30, 32 and passive fibers 36 is substantially uniform. As known, a mode field diameter depends upon the core size and the difference between the core and cladding refractive indexes ($\Delta n$). All active fibers used within the scope of the present disclosure, preferably, are configured as nanostructured silica-fluorine (Si—F) fibers with nanoparticles of phosphate glass (P). The P nanoparticles provide for better solubility of rare-earth ions enriching the phosphate glass. Enriching the nanostructured active Si fibers with fluoride (F) ions decreases the Δn value, thereby increasing the mode field diameter of active fibers so as to substantially match it with the mode field diameter of passive fibers 36. Instead of or in addition to F ions, boron (B) ions may be used as well.

Referring now to all passive and active fibers, it is preferred that these fibers be configured as polarization-maintaining fibers for the following reason. Optical fibers always exhibit some degree of birefringence which means that the symmetry of the propagating light is broken. As a consequence, the polarization of light propagating through the fiber gradually changes in an uncontrolled way, which depends on any bending of the fiber and on its temperature. This problem can be solved by using a polarization-maintaining fiber, which is a fiber with a strong built-in birefringence. Provided that the polarization of light, launched into the fiber, is aligned with one of the birefringent axes, this polarization state will be preserved even if the fiber is bent. A commonly used method to introduce strong birefringence is to include two stress rods of a modified glass composition in the preform on opposite sides of the core reminding a panda bear; hence this configuration is known as panda fibers. Another technique is to use an elliptical core.

The use of EDFLs fibers 30-32 configured in accordance with the above-discussed configuration has additional advantages over Yb active fibers in powerful laser system 10 of FIG. 1. First, a system output optical signal of disclosed system 25 is generated at the desired wavelength in a 1.5 μm band which is considered eye-safe. Furthermore, the 1.5 μm band is required in numerous military applications, and a signal, emitted at a wavelength in 1.4-1.6 μm range, is known for minimal hydrogen-induced power losses. Also, the energy of Er photon is about 6500 $cm^{-1}$. This energy is insufficient for having the Er photon exited at the pump powers higher than those which are sufficient for transitioning Yb photons in Yb/Er fiber systems of the prior art. Hence, the EDFLs of system 25 do not degrade at the high pump powers in the desired 1.5 (equal to or above 1530) μm wavelength range.

FIG. 6 illustrates a further embodiment of the disclosure. Similar to system 25 of FIG. 3, a system 75 is configured with an LMA MC&MM Er-doped fiber oscillator or gain block based on an EDFL 68 and a similarly configured additional one or more gain blocks or amplifiers EDFLs 70. The EDFLs 68, 70 of respective gain blocks 68, 70 each are capable of lasing laser emission propagating in a single or fundamental mode without coupling to higher modes, as explained in reference to FIG. 3. Except for a pumping assembly, which is explained in detail hereinbelow, the configuration of system 75 is similar to the one shown in FIG. 3

Figure 7:
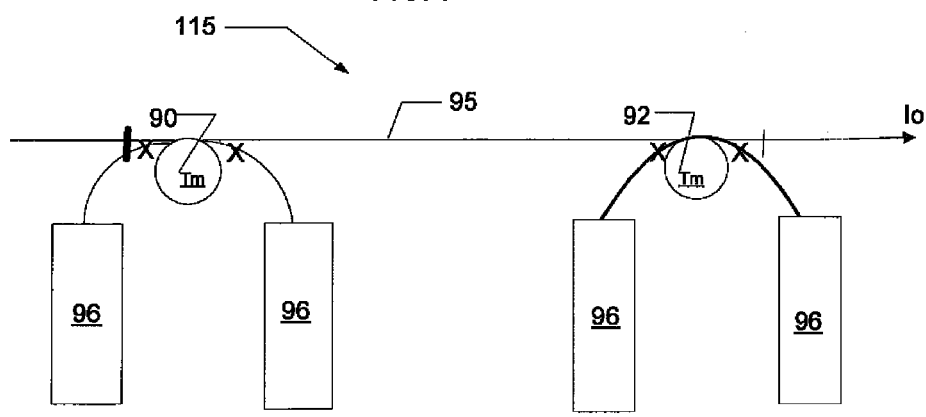
FIG. 7 is a schematic view of a powerful fiber laser system configured in accordance with a further embodiment of the present disclosure including a plurality of LMA MC&MM Tm active fibers pumped by respective pumping assemblies each of which is provided with a plurality of SM Yb/Er-codoped fiber pumps.

In contrast to FIG. 3, pumping assemblies 85 of FIG. 7 each include a pump signal transforming stage configured with a SM Yb/Er-codoped fiber lasers $76_{1-n}$ defining respective channels $85_{1-n}$. The plurality of fiber lasers $76_{1-n}$ is combined by a SM-MM combiner 74 delivering the pump output through the narrow core of its output lightguide 83, which is coupled to the pump input of a fiber coupler, to EDFL 68, 70. Each of Yb/Er-doped fiber pumps $86_{1-n}$ is pumped by a plurality of MM diodes 80 combined by a respective MM-MM combiner 78.

The single SM Yb/Er-doped fiber laser 76 is capable of delivering about 50-200 W and generating an optical output in about 1520 nm-1540 nm range. In a way readily understood by one of ordinary skills in the laser art, the EDFL is operative to lase a system output in the desired range of 1550-1600 nm range. The system 75, like system 25 of FIG. 3 can deliver up to 20 kW and emit light in a 1.5 μm band.

FIG. 7 illustrates still in a further alternative embodiment of the disclosure. A ultra-powerful SM fiber system 95 includes a LMA multi-clad MM fiber oscillator 90 and one or more similarly structured fiber amplifiers 92 (only one is shown) doped with Thulium (Tm). The MM core of each of Tm lasers 90, 92 is configured to support only a fundamental mode without essential coupling to higher modes. The Tm fiber oscillator and amplifier 90, 92 respectively each are capable of lasing a system output Io at wavelengths ranging from about 1750 to about 2100 nm in a 2 μm band. The 2 μm band is also considered completely "eye-safe". While the overall efficiency of system 95 utilizing Thulium fibers may not be as high as in the embodiments of respective FIGS. 3 and 6, still great powers and safety characteristics may be extremely useful in military application and special industrial applications.

The pumping configuration of the illustrated system 95 is identical to the one of FIG. 6. A plurality of pumping assemblies 96 each, thus, include multiple Yb/Er lasers generating a pump output at a wavelength of about 1550-1560 nm and combined together by a SM-MM combiner configured identically to those of FIGS. 3 and 6, respectively.

Figure 8:
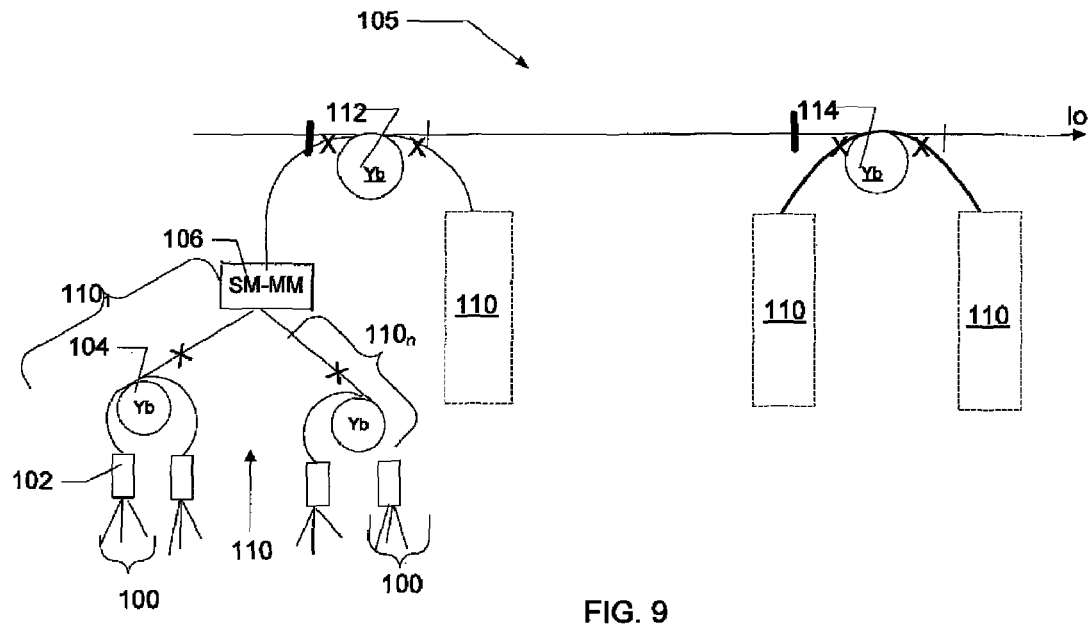
FIG. 8 is a schematic view of a powerful fiber laser system configured in accordance with a further embodiment of the present disclosure including a plurality of LMA MC&MM Yb active fibers pumped by respective pumping assemblies each of which is provided with a plurality of SM Yb fiber pumps.

FIG. 8 illustrates a further embodiment of an ultra powerful fiber laser system 105 including a gain block with an LMA MM&MC Yb oscillator 112 and at least one or more amplifiers 1114. Multiple pumping assemblies 110 each are configured with a plurality of channels $110_{1-n}$. Each channel includes an array of laser diodes 100 combined by a MM-MM combiner (not shown) the output of which is spliced to respective SM Yb fiber laser pump 104 lasing a pump output at a wavelength between about 1000-1030 nm. Similar to the previously disclosed embodiments, multiple Yb lasers 104 of respective channels $110_{1-n}$ are combined by a SM-MM combiner 106 having its MM output launch a pump light into the inner cladding of respective LMA MM&MC YbDFL 112, 114. The YbDFLs 112 and 114, respectively, each lase a system optical output Io at a wavelength of about 1060-1100 nm. Similar to the above disclosed embodiments, the closeness of the pump wavelength to that of the Yb active fiber leads to a substantially decreased heat generation.

Figure 9:
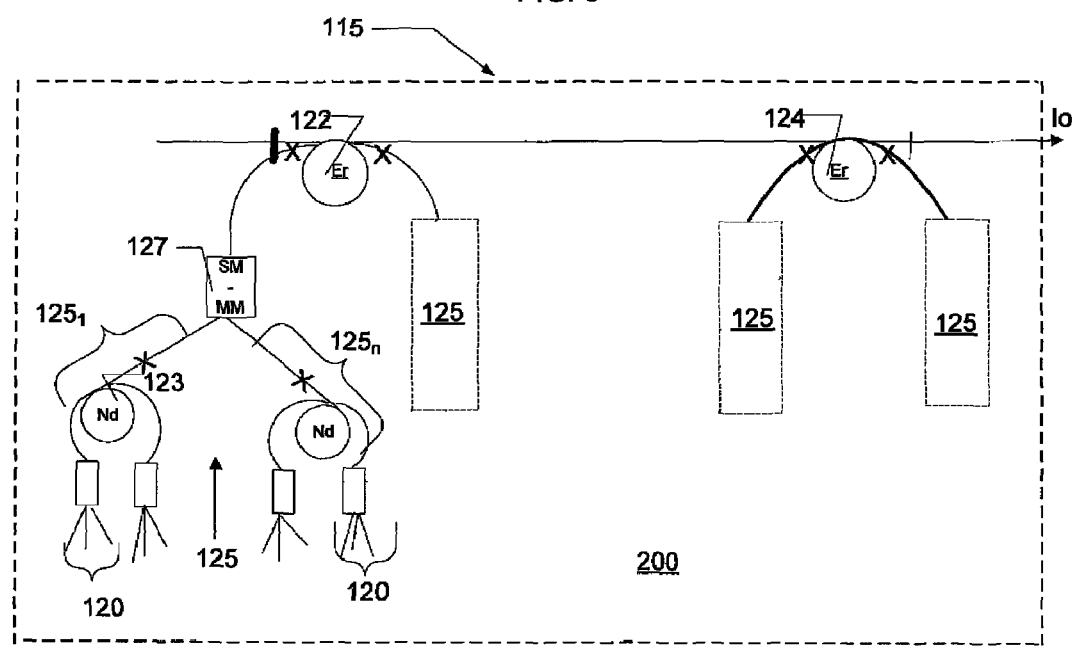
FIG. 9 is a schematic view of a powerful fiber laser system configured in accordance with a further embodiment of the present disclosure including a plurality of LMA MC&MM Yb active fibers pumped by respective pumping assemblies each of which is provided with a plurality of SM Nd fiber pumps.

FIG. 9 illustrates still a further embodiment of the disclosure topographically identical to the previously disclosed embodiments of respective FIGS. 3 and 6-8. A powerful fiber laser system 115 is provided with multiple gain blocks each based on an LMA MM&MC Yb fiber 110, 112, and further has multiple pumping assemblies 125. Each pumping assembly 125 has a plurality of channels $125_{1-n}$ each configured with a SM Nd fiber laser 123 which is pumped by a respective array of laser diodes 120. The plurality of SM Nd lasers 123 is combined by a SM-MM combiner 127. The Nd fiber lasers 123 each generate an optical output at a wavelength of about 920-940 nm. The output of the SM-MM combiner 127 are coupled to respective inputs of YbDFL 122, 124 lasing an optical output Io at a wavelength of about 970-1000 nm or longer depending on gratings which are written in respective passive fibers defining a resonant cavity which receives a gain block. Similar to the above disclosed embodiments, the closeness of the pump emission wavelength of Nd lasers to that of YbDFL 122, 124 fiber leads to a substantially decreased heat generation.

Each of the embodiments of the present disclosure is provided with a detection-control means. The disclosed powerful laser system may have a plurality of sensors including, among others, a fiber fuse sensor operative to detect inflammation of the system, back reflection and output power sensors operative to monitor the output power and others. The control means further include a central processing unit (CPU) operative to control the parameters of disclosed systems in response to data received from respective sensors. For example, if a fire-hazardous situation is detected, the CPU can execute software operative to shut down the entire system. If the output power of the disclosed powerful fiber laser system is insufficient, a software executable by the CPU would be operative to increase an input current signal applied to primary sources via a controller. Other known parameters, such as back reflection, is monitored by a respective sensor (not shown) coupled to the CPU.

The fiber components of the disclosed ultra-powerful SM fiber laser system are directly spliced to one another without respective free spaces between spliced ends. The coupled gain blocks with respective SM-MM combiners and pumping assemblies are placed on the bottom of a fiber block (not shown) so as to totally immerse in a heat-conductive material. The material may be silicone having relatively high heat conductivity and, thus, serving as a heat sink. To improve the heat conductivity, copper and/or silver material is typically added to the silicone material. Finally, the fiber blocks are integrated in a single monolithic unit or housing 200 as shown in phantom lines of FIG. 9.

The disclosed systems 25, 75, 95, 105 and 115 illustrated by respective FIGS. 3, 6-9 have been discussed as operating in a continuous-wave (cw) mode, i.e., each laser system 25, 75, 95, 105 and 115 is continuously pumped and continuously emits light. In the CW mode, thus, an input current signal applied to broad area diodes 48 (FIG. 3) is continuous. However, the disclosed fiber laser systems may operate in a pulse mode, i.e., the disclosed systems each emit light in the form of optical pulses.

In a CW-mode fiber laser system, continuously increasing a current input applied to broad area diodes 48 (FIG. 3) will eventually lead to the decreased output power of system 25 due to the heat losses. In a pulse-mode system, instead of being continuously applied, an input signal is pulsed, which leads to decreased heat generation in the powerful fiber laser system of the disclosure. Consequently, the average output power of SM fiber laser systems of FIGS. 3, 6-9, if pulsed, respectively, may be increased, as compared to a CW-mode system, due to relatively low heat losses.

It will be apparent to those skilled in the art that various modifications and variations can be made in the presently disclosed laser powerful system. Thus, it is intended that the present disclosure cover the modifications and variations of this disclosure provided they come within the scope of the appended claims and their equivalents.

The invention claimed is:

1. A fiber laser system comprising:
   at least one active fiber (AF) having a MM core configured to propagate a fundamental mode without exiting higher modes and operative to lase an optical system output at a first wavelength;
   at least one pumping assembly comprising a plurality of SM pump fiber lasers each operative to emit an optical pump output at a second wavelength shorter than the first wavelength of the at least one AF; and
   a combiner configured to combine the optical pump outputs of the plurality of SM fiber lasers into a pump output beam launched into the at least one AF.

2. The fiber laser system of claim 1, wherein a difference between the first and second wavelengths is less than about 0.05 Lp.

3. The fiber system of claim 1, wherein the SM fiber lasers of the at least one pumping assembly each are configured as Raman fiber laser, the AF being an Er-doped AF operative to generate the optical system output at the first wavelength of above about 1530 nm, the Raman laser generating the pump output at the second wavelength varying between about 1480 and about 1510 nm.

4. The fiber laser system of claim 1, wherein the SM fiber lasers of the at least one pumping assembly each are configured as an Yb/Er codoped fiber operative to generate the pump output at the second wavelength varying between about 1530 and about 1540 nm, the at least one AF being an Er doped fiber operative to generate the optical system output at the first wavelength of about 1560-1600 nm.

5. The fiber laser system of claim 1, wherein the SM fiber lasers of the at least one pumping assembly each are an Yb/Er codoped fiber operative to generate the pump output at the second wavelength of about 1550-1600 nm, the at least one AF being a Tm doped fiber operative to lase the optical system output at the first wavelength in a range between about 1750-2100 μm.

6. The fiber laser system of claim 1, wherein the SM pump fiber lasers of the at least one pumping assembly each are a Nd doped fiber operative to generate the pump output at the second wavelength of about 920-945 nm, the at least one AF being an Yb doped fiber operative to lase the optical system output at a wavelength in a about 974 nm-1 μm band.

7. The fiber laser system of claim 1, wherein the SM pump fiber lasers of the at least one pumping assembly each are an Yb fiber laser operative to generate the pump output at a wavelength of about 1000-1030 nm, the at least one AF being an Yb doped fiber operative to generate the optical system output at a wavelength from about 1050 to about 1080 nm.

8. The fiber laser system of claim 1, wherein the combiner is selected from the group consisting of a MM-MM and a SM-MM, the SM-MM combiner having a MM output operatively spliced to a pump input of the at least AF, the SM-MM combiner coupling output ends of the respective SM fiber lasers so as to launch a low mode beam into the pump input of the at least one AF, wherein the at least one AF, fiber gratings and at least one pumping assembly are integrated in a monolithic unit without free space interfaces upon splicing to one another.

9. The fiber system of claim 1 further comprising a second AF with a MM core, losslessly coupled to the one AF, and a second pumping assembly.

10. The fiber system of claim 1, wherein the at least one AF is a Si—F fiber configured with nanoparticles of phosphate glass enriched by ions of erbium (Er) and ions selected from the group consisting of La, Eu and Yb and a combination thereof, the Er being doped at a concentration exceeding 300 ppm and each of the La, Eu and Yb and the combination thereof being doped at a concentration exceeding 3000 ppm to decrease an up-conversion of the Er.

11. The fiber system of claim 9 further comprising a third AF losslessly coupled to the second AF and pumped by a respective pumping assembly, the plurality of SM lasers of each of the pumping assemblies being arranged in groups so that the AF is simultaneously pumped in opposite directions, wherein the system optical output has a maximum power of about 20 KW.

12. The fiber system of claim 1, wherein the fiber system is selected from the group consisting of a continuous-wave laser system and a pulsed laser system.

13. The fiber system of claim 1 further comprising a SM output delivery passive fiber downstream from and coupled substantially losslessly to the at least one active fiber (AF), the output delivery passive fiber lasing the system output which is a substantially diffraction limited beam.

14. The fiber system of claim 1, wherein the pump output beam has an $M^2$ factor varying between 4 and 8.

* * * * *